United States Patent

[11] 3,590,464

[72] Inventors Paul Wildi;
Lesley L. Seyler, both of San Diego, Calif.
[21] Appl. No. 805,247
[22] Filed Mar. 7, 1969
[45] Patented July 6, 1971
[73] Assignee Gulf Energy & Environmental Systems, Inc.
San Diego, Calif.

[54] THREADED FASTENER AND METHOD OF MAKING THE SAME
16 Claims, 12 Drawing Figs.

[52] U.S. Cl. .................................................. 29/421,
10/86, 29/175, 29/516, 151/21, 287/60
[51] Int. Cl. ................................................. B21d 53/24,
B21d 39/00, B23p 11/00, B23p 17/00
[50] Field of Search .......................................... 29/175,
243.52, 421, 516, 200 E; 10/86; 72/56, 707;
151/21 B, 21 C; 287/60

[56] References Cited
UNITED STATES PATENTS
| 609,144 | 8/1898 | Goddin | 151/21 |
| 830,956 | 9/1906 | Bagge | 151/21 |
| 2,976,907 | 3/1961 | Harvey et al. | 29/421 |
| 3,210,842 | 10/1965 | Schwinghamer | 29/200 |
| 3,429,159 | 2/1969 | Wildi | 29/421 |
| 3,501,828 | 3/1970 | Schultz | 29/421 |

FOREIGN PATENTS
| 764,544 | 3/1934 | France | 151/21 |

Primary Examiner—Charles W. Lanham
Assistant Examiner—E. M. Combs
Attorney—Anderson, Luedeka, Fitch, Even and Tabin ABSTRACT: A threaded fastener and a method of making the same are provided in which an outer member with an opening therein receives an internally threaded female member which in turn is adapted to receive an externally threaded male member screwed in an entry end of the female member. The female member is disposed at least partially within the opening of the outer member. A time varying magnetic field is established outside of the outer member to compress the outer member, thus simultaneously joining the outer member and the female member and increasing resistance to rotation of the male member in the female member.

INVENTORS
PAUL WILDI
LESLEY L. SEYLER

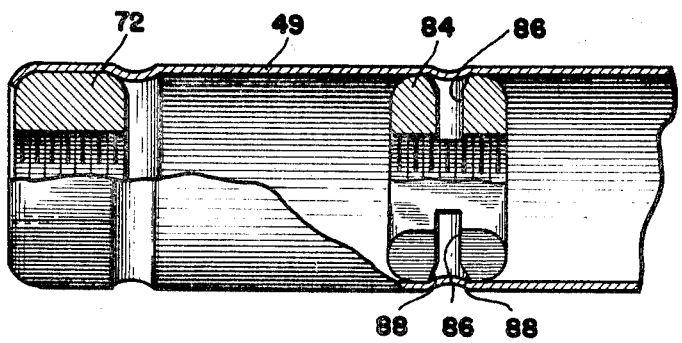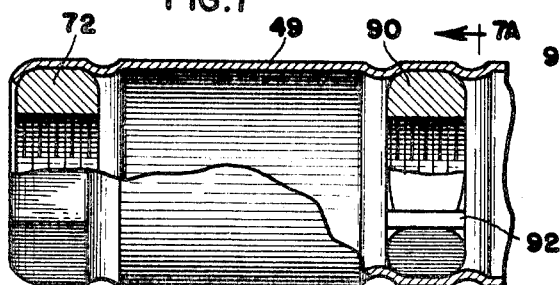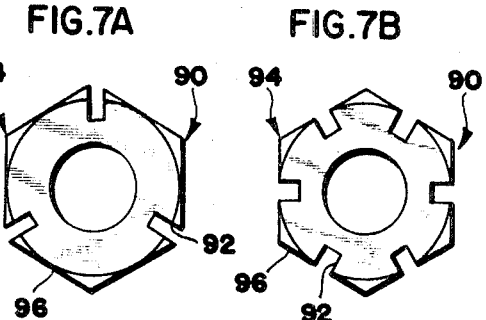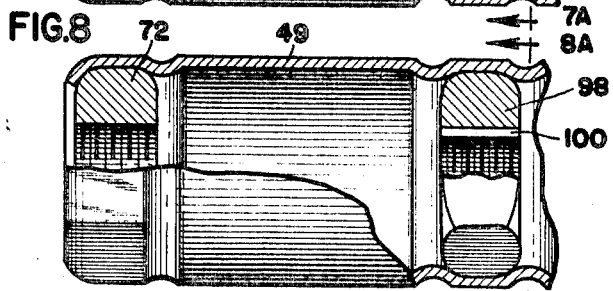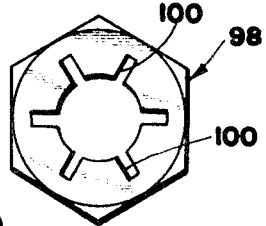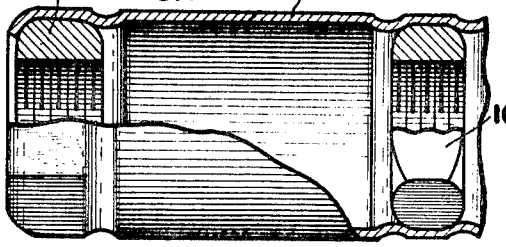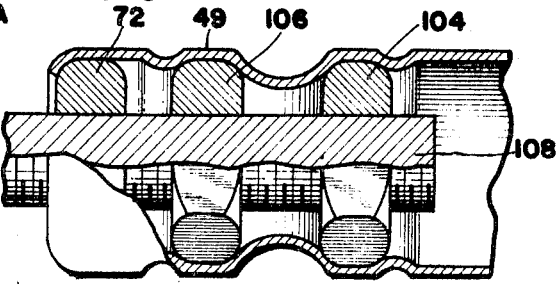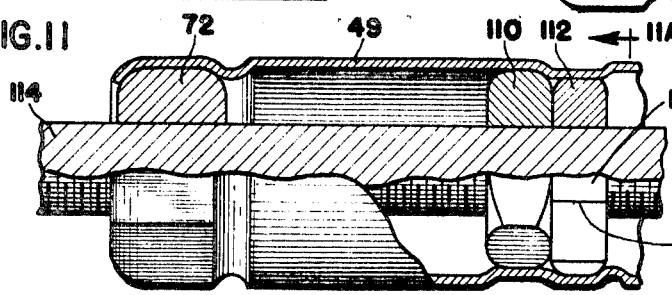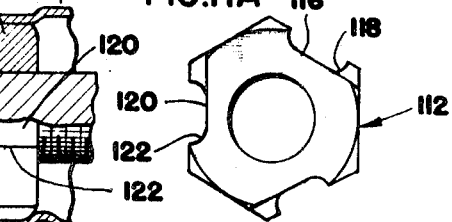

THREADED FASTENER AND METHOD OF MAKING THE SAME

This invention relates generally to fasteners and, more particularly, to an improved threaded fastener and a method of making such a fastener utilizing magnetic forming techniques.

Various types of fasteners are utilized to hold parts of machines together. Permanent and fixed connections may be made by riveting or welding. Adjustable or removable connections often utilize threaded devices such as a nut and bolt. A recurring problem with threaded devices is the tendency of unavoidable vibrations or of the normal motions of the machine to loosen the engagement of the threaded parts, causing the desired adjustment of the relative positions of the parts to change or even causing complete disengagement. Many locking devices have been developed to overcome such problems such as spring action clamps which clamp down upon the bolts, cotter pins designed to extend through matching holes in joined nuts and bolts and slotted nuts formed of relatively soft materials which deform as they are screwed on bolts, thereby increasing the frictional resistance to rotation of the bolt in the nut.

A particular example of the problem of providing secure threaded fastenings, which is most important in connection with automotive safety, may be seen in the tie rods of the steering linkage of an automobile. The tie rods must be adjustable in length for alignment of the front wheels. Yet after adjustment they must be securely locked so as to transmit the desired steering motion faithfully. Conventionally, a tie rod includes a connecting bar with hollow, threaded, longitudinally slotted ends, which are engaged by threaded studs attached to ball joints. The threads are right handed at one end and left handed at the other so that the distance between the ball joints is adjustable by rotation of the connecting bar, in the manner of a turnbuckle. After adjustment the parts are locked in position by clamps attached to the connecting bar which engage the studs through the slots in the bar. This arrangement has been severely criticized from the standpoint of safety since the locking clamps can easily fail. It will be apparent that an adjustable fastener assembly which can be more securely locked against undesired movement would be useful in solving this current problem as well as in a wide variety of applications involving locknuts, turnbuckles and adjusting screws.

An important feature of the present invention is the provision of an improved threaded fastener utilizing magnetic forming techniques. As used herein the term "fastener" includes both a complete fastener assembly and a part thereof to be used with other suitable parts. Magnetic forming is a method of fabrication utilizing energy furnished by an intense magnetic field. Generally, a large pulsed or alternating current is passed through a coil so as to develop a magnetic field in the space adjacent the coil. A conductive workpiece positioned in the space adjacent the coil has a current induced in it by the magnetic field. The induced current opposes the coil current and the interaction between the two currents produces large forces acting on the workpiece. The general method and an apparatus for performing the method are described in detail in U.S. Pat. No. 2,976,907 to Harvey et al. Using such magnetic forming techniques, it is possible, for example, to join a tube to a shaft securely by compressing the tube radially about the shaft. Compression coils for such purposes have been developed which can produce pressures as high as 80,000 pounds per square inch. The amount of pressure applied is easily controlled with precision. Heretofore such magnetic swaging operations have been used to form fixed connections rather than adjustable or removable connections.

The invention also features the adjustable or removable attachment of a threaded inner male member or bolt to an outer or tubular member through an intermediate threaded annular female member, preferably formed of a wall of hard metal such as steel, which surrounds the bolt. Other materials, such as plastics, may be used for fabrication of the female member. These may be internally threaded, as in the case of the hard metal, or not threaded, so that the deformation occurring during the joining operation causes the plastic material to flow about the threads of the male member, thereby forming a thread in the plastic member. Since the use of hard metal is the preferable material to provide maximum strength, it is the method described hereinafter. An important aspect is that by one operation the outer member is securely joined to the annular member at the same time that the annular member is prepared for joining or joined to the male member. Specifically the outer member is compressed about and joined to the female member by magnetic forming techniques. The pressure applied is carefully controlled so that, as the pressure is transmitted to the female member, it causes a predetermined change in the threads of the female member. As a result, the interference between the male member or bolt and the nut, and hence the amount of torque required to turn the bolt in the nut after the deformation, may be predetermined so as to be greater than that torque resulting from vibrations but not so great as to make deliberate manual adjustment difficult. In addition the threads adjacent the entry end of the female member may be left unchanged so that entry and easy starting of the bolt is facilitated. Furthermore, the joining of the outer member and the female member and the predetermined change in configuration of the threads of the female member take place simultaneously.

It is, therefore, an important object of the present invention to provide an improved threaded fastener and a simplified method of making the same using magnetic forming techniques.

Another object of the invention is to provide a method of making a threaded fastener with parts which will not loosen under the influence of vibration and other movements but which can be adjusted in their relative positions.

Yet another object of the invention is to provide a threaded fastener with parts which are easily initially positioned with respect to one another and which securely hold one another after later engagement.

Still another object of the invention is to provide a method of making a threaded fastener comprising parts formed of steel or other hard metal to minimize failure under stress.

A further object of the invention is to provide a threaded fastener which is simple and inexpensive in construction and operation.

Other objects and advantages of the invention will be apparent from the following description and the accompanying drawings in which:

FIG. 6 is a side elevational view, partially broken away and partially in section, of yet another fastener showing various features of the invention;

FIG. 7 is a side elevational view, partially broken away and partially in section, of another fastener showing various features of the invention;

FIG. 7A is an end elevational view of the female member of FIG. 7 looking in the direction of the arrows 7A-7A;

FIG. 7B is an end elevational view similar to FIG. 7A of another form of female member which might be used in the fastener shown in FIG. 7;

FIG. 8 is a side elevational view, partially broken away and partially in section, of still another fastener showing various features of the invention;

FIG. 8A is an end elevational view of the female member of FIG. 8 looking in the direction of the arrows 8A—8A;

FIG. 9 is a side elevational view, partially broken away and partially in section, of yet another fastener showing various features of the invention;

FIG. 10 is a side elevational view, partially broken away and partially in section, of still another fastener showing various features of the invention, FIG. 11 is a side elevational view, partially broken away and partially in section, of another fastener showing various features of the invention; and FIG. 11A is an end elevational view of the female member of FIG. 11 looking in the direction of the arrows 11A—11A.

Figure 1:
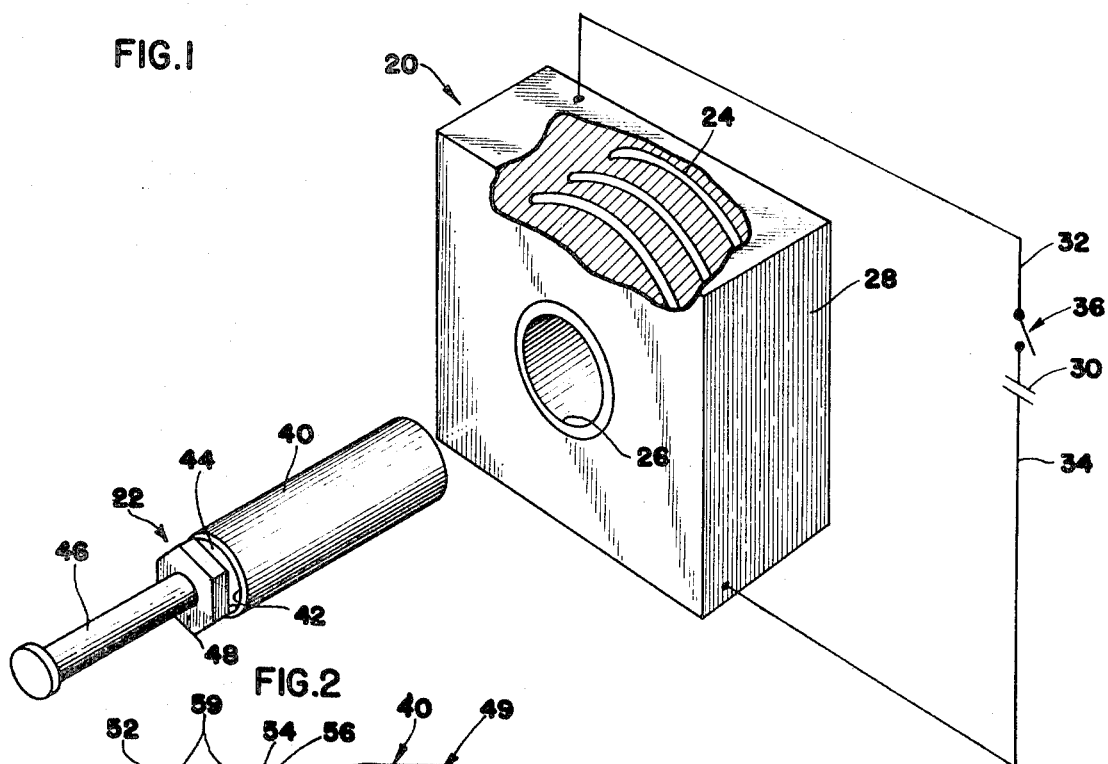
FIG. 1 is a schematic perspective view of apparatus adapted for making a fastener in accordance with the present invention.

Generally, FIG. 1 shows an example of a magnetic forming device 20 for producing a varying magnetic field of high intensity to form a conductive workpiece 22 which, as illustrated, is generally cylindrical. The device 20 includes a cylindrical compression coil 24 which surrounds an annular workspace 26 and is mounted in a supporting structure 28. A time varying magnetic field of predetermined intensity and shape is established in the workspace by passing a large pulsed or alternating current through the coil 24. The current is provided by connecting a source of energy 30, such as a capacitor bank or a motor generator, through a pair of conductors 32 and 34 to the coil 24. Suitable switch means 36 such as a thyratron, ignitron or the like is connected between the coil 24 and the source 30.

In operation, the workpiece 22 is inserted into the workspace 26 and the energy source 30 is applied to the coil 24 by closing the switch 36. The resulting current sets up a high intensity field in the workspace. This field causes pressures to be exerted on the workpiece which are compressive and generally radial, although some axial components of force might exist if the workpiece were not cylindrical or were positioned off center. The workpiece, although ordinarily of a conductive material, might be of nonconductive material surrounded by a conductor which would transmit the pressures to the workpiece.

The apparatus shown in FIG. 1 may be utilized in making the various forms of fasteners according to the invention shown in the remaining figures. Very generally, the method includes providing an outer member 40 with an opening 42 and providing a hollow female member 44 formed of a wall of hard metal to receive an externally threaded male member or bolt 46 screwed into an entry end 48 of the female member 44. The female member 44 is disposed at least partially within the opening 42 of the outer member 40, and a time varying magnetic field is established outside of the outer member. The field is such that it compresses the outer member 40, joining it to the female member 44, and the outer member simultaneously exerts forces on the female member which cause the threads thereof to be changed in configuration, thus increasing the resistance to rotation of the male member 46 in the female member. The field is controllable so that the change produced may be predetermined. Thus, the torque required to turn the engaged bolt may be made greater than that produced by vibrations and the like but small enough that deliberate adjustment of the bolt's position is possible. A value for this torque of 75 ft.-lb. may be taken as typical.

Figure 2:
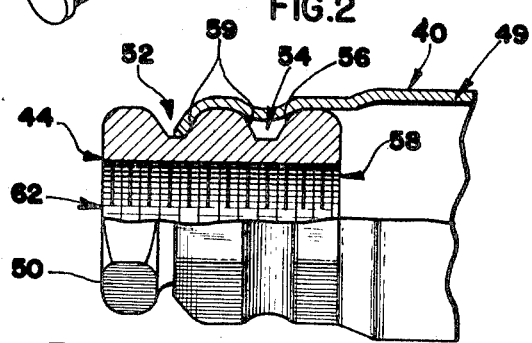
FIG. 2 is a side elevational view, partially in section, of a completed fastener showing various features of the invention.
Figure 3:
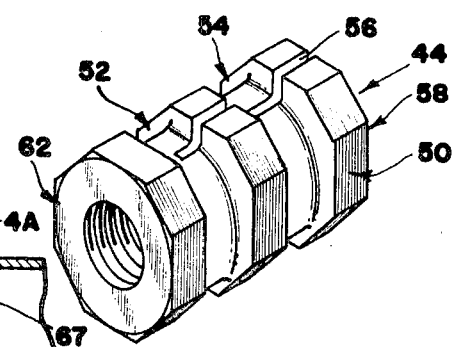
FIG. 3 is a perspective view prior to fabrication of the female member of the fastener shown in FIG. 1.

As shown in all of the figures, an outer member 40 is provided in the form of a hollow tube 49 which has an opening 42 at least one end. A preferred form of the invention, as shown in FIGS. 2 and 3, contemplates providing a female member 44 in the form of an elongated annular internally threaded bushing 50 preferably of steel. The bushing is generally hexagonal in cross section and, as illustrated, is provided with two external annular grooves or channels 52 and 54 to improve the secure joining of the bushing to the tube 49, although one or more than two grooves might be utilized. The bushing 50 is provided with an axially extending slot 56 through the wall which does not, however, extend the entire length of the bushing. Thus, a portion of the wall is weakened so as to facilitate permanent deformation of the bushing threads but a portion of the wall is not weakened so as to provide undeformed threads for easy starting. The slot 56 extends toward the center of the bushing from one end 58 thereof, which end may be referred to as the "inboard end" since this is the end placed furthest within the opening in the outer member. The opposite end or "outboard end" 62 of the female member may also be referred to as the entry end, since it is from this end that the male member enters the female member. The slot 56 terminates in the vicinity of the groove 52 which, in performance of the method, is placed adjacent the edge of the opening of the outer member.

In performing the method, the bushing 50 is inserted partially into the opening 42 of the tube 49, with the inboard end 58 first, until the edge of the opening overlaps the groove 52. The threaded male member or bolt may then be inserted into the entry end 62 of the bushing to approximately the desired length, or alternatively, this step may take place at a later stage of the process. In either event the assembly of the bushing and the tube comprising a workpiece 22 are placed in the workspace 26 of the magnetic forming apparatus. The energy source 30 is connected to the coil 24, and a controlled time varying magnetic field is thereby produced. Due to the coil and workpiece configurations controlled compressive forces are thereby exerted on the tube, and the tube is caused to conform generally to the outline of the bushing, although actual contact of the two members need not take place over the entire width of the groove 54. The pressures exerted are selected and controlled so as to cause the tube and bushing to be securely joined to one another. The secure junction is aided by the grooved shape of the bushing, the sides of the grooves providing bearing surfaces 59 against the inside of the tube which resist longitudinal relative motion of the tube and bushing.

It should be apparent that as the tube is swaged onto the bushing it will assume the latter's hexagonal shape and thus provide a wrenching head for grasping by a wrench to turn the tube and bushing relative to a bolt. Such a manipulation is made even more simple by the expedient of only inserting a portion of the bushing into the tube. The hexagonal portion outside the tube provides a superior wrenching head with corners which are not rounded as are the corners of the tube swaged onto the bushing.

At the same time that the tube 49 is being swaged onto the bushing 50, it is transmitting compressive forces to the bushing. Depending upon the strength of the material used for the bushing, this might cause a slight or an appreciable reduction in the inner diameter of the female member so that there would be less clearance or more interference between the bushing threads and the threads of a bolt inserted into the bushing. It will be apparent that such a collapse of the wall and deformation of the threads could take place without the presence of the bolt in the bushing so that the step of inserting the bolt in the bushing could take place after the compressive force produced by the magnetic field is applied. Inserting the bolt first, however, may result in more intimate contact of the two sets of threads.

The thread deformation caused by radial compression, of course, increases the resistance to rotation of the bolt in the bushing, which is the desired result. However, in the case of a hard metal such as steel, the inner diameter of an ordinary bushing might not be reduced sufficiently to attain the desired result without use of excessive pressure. This problem is solved by providing the wall of the female member with a portion thereof which is weaker than the remainder of the member so as to permit deformation of the threads of the female member by radial compression thereof. Specifically, with respect to the embodiment shown in FIGS. 2 and 3 the slot 56 in the bushing comprises such a weakened portion and the portion of the wall outside of the outboard end of the slot is not weakened. Since the resistance of the bushing to the compressive forces exerted on the bushing is not radially symmetrical, the edges of the slot will be forced toward one another, thus permanently deforming the wall of the bushing and hence permanently deforming the threads of the female member. It should be noted however that the outboard end threads of the female member would not be appreciably deformed so that entry and starting of the bolt would be facilitated.

Figure 4:
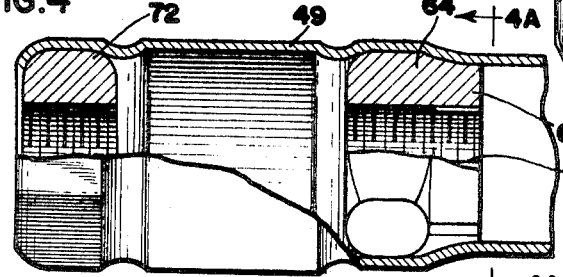
FIG. 4 is a side elevational view, partially broken away and partially in section, of another fastener showing various features of the invention.
Figure 4A:
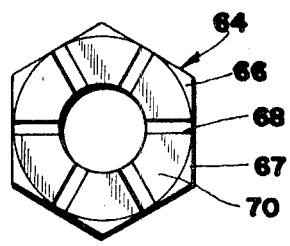
FIG. 4A is an end elevational view of the female member of the fastener of FIG. 4 looking in the direction of the arrows 4A-4A.

Another fastener assembly as shown in FIGS. 4 and 4A contemplates the use of a castellated nut 64 in hexagonal form having a main body 66 and a crown 67 with a plurality of radial slots 68 in the crown defining crenelations 70. The nut 64 is positioned in the tube 49 with the crown as the inboard end 58 thereof. The plurality of slots so weakens the crown portion of the nut that the crenelations 70 are forced radially inward by application of the magnetic force to the tube, thereby increasing the interference of the threads in the crenelations 70 with a bolt inserted therein. The threads in the main body portion of the nut are undeformed since the portion of the wall forming the main body is stronger and easy starting of the bolt is thus facilitated. As illustrated in FIG. 4 as well as in subsequent figures, a simple threaded nut 72 is also provided adjacent the entry end of the tube and attached thereto by a separate application of magnetic force to the tube 49. Such a nut may be provided if a greater length of bearing of the female member and bolt is desired.

Figure 5:
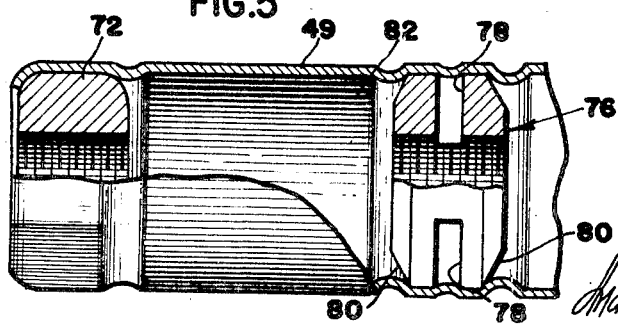
FIG. 5 is a side elevational view, partially broken away and partially in section, of still another fastener showing various features of the invention.

The fastener assembly illustrated in FIG. 5 shows another simple outboard nut 72 within the tube 49 like that shown in FIG. 4 and an inboard nut 76 provided with two centrally located slots 78 extending transverse to the axis of the nut 76 and intersecting the inner diameter thereof thus partially separating two portions of the nut 76 from one another. The edges of at least the inboard nut 76 and, as shown, both nuts, are chamfered as shown at 80. As a result the force exerted by the tube 49 on the nut 78 under magnetic forming forces is translated into axial compressive forces across the slots, again deforming the threads of the nut 78. Another aspect of this type of assembly is that the threads of the two portions of the nut 76 are moved relative to one another and hence placed out of phase with one another. Thus, when a bolt is inserted in the nut 76 the bolt threads will be necessarily out of phase with the threads of one portion of the nut 76, further increasing the resistance to rotation. It will be apparent, of course, that only one such transverse slot 78 might be used in some instances. As also illustrated in FIG. 5 a cylindrical annular bushing 82, which may or may not be threaded, is provided between the nut 72 and the nut 76 and occupies most of the space between the two nuts. The bushing is formed of a material which is relatively incompressible compared to the nuts 72 and 76 and, therefore, its presence permits the attachment of the two nuts to the tube 49 by the same magnetic forming operation without undue deformation of the intermediate portion of the tube.

FIG. 6 illustrates a variation of the embodiment shown in FIG. 5. Again, as illustrated, a simple outboard nut 72 is positioned in the tube 49. An inboard nut 84 is provided with transversely oriented slots 86 intersecting the inner diameter again dividing the nut into two connecting portions. The edges of the nut 84 adjacent the slots 86 are chamfered as shown at 88 so that upon the application of magnetic forming pressure to the tube 49, the edges of the slots 86 are forced apart at their outer ends thus deforming the threads of the nut 84 and at the same time placing the threads of the two portions of the nut out of phase with one another. Hence, at least some threads of the nut will be out of phase with those of a bolt and the resistance to rotation of the bolt in the nut will be increased.

FIGS. 7, 7A and 7B illustrate the use of an inboard nut 90 having axially extending weakening slots 92 on the exterior surface so that upon application of compressive forces by magnetic forming a reduction of the inner diameter takes place. As illustrated, none of the slots intersect the inner diameter of the nut. In the embodiment of FIG. 7A the slots are placed in corners 94 of the nut while in the embodiment of FIG. 7B the slots are placed on the flats 96 of the nut. The configuration of FIG. 7A results in somewhat less thread deforming pressure since the wall of the tube 49 accelerates over a shorter distance before contacting the nut but it is easy to manufacture. It would be possible to place the slots in all corners of the nut. Use of only three of six corners of a hexagonal nut for slots, however, provides a better fit in the tube and additional pressure to deform the nut threads. The embodiment of FIG. 7B provides a better fit in the tube at the corners of the nut than that of FIG. 7A and, hence, a better defined external wrenching head.

FIG. 8 is a variation of FIG. 7 in which an inboard nut 98 is provided with weakening slots 100 extending outwardly from its inner diameter so that pressure on the nut from the tube 49 causes partial collapse of the nut. FIG. 9 illustrates a further variation where the nut 102 is provided with a major internal thread diameter which approaches the diameter measured across the flats of the nut. As a result the portions of the nut walls adjacent each flat are weak relative to the portions adjacent the corners and collapse of the nut under the pressure caused by magnetic forming takes place. This form of fastener is quite sensitive to variations in material hardness and to the fit between threads of the nut and a bolt.

The embodiment shown in FIG. 10 illustrates a slightly different approach to making a fastener assembly which further develops the principle of the fasteners shown in FIGS. 5 and 6. In FIG. 10 two separate inboard nuts 104 and 106 are provided, slightly spaced from one another in the tube 49 and engaged by a threaded bolt 108. The assembly of the tube 49, nuts 104 and 106 and bolt 108 is inserted into the workspace of a magnetic forming machine, as illustrated in FIG. 1, with the portion of the tube 49 between the two inboard nuts 104 and 106 so positioned as to be subject to the greatest compressive force. Upon discharge of the power source, the portion of the tube between the nuts is compressed to a smaller diameter and, concomitantly, the two nuts are forced toward one another along the tube axis but do not rotate any substantial amount. The threads of at least one of the nuts are thereby placed out of phase with the threads of the bolt and resistance to rotation of the bolt in the nut is increased. Additionally, permanent deformation of the nut threads by pressure against the bolt threads may be caused. This particular embodiment is the least sensitive to variations in material hardness and thread fit. Hence, a controlled amount of thread deformation may be produced more easily using standard nuts and bolts.

The embodiment in FIGS. 11 and 11A is similar to that of FIG. 10 in that two nuts are utilized and caused to move oppositely to one another so that the threads of the nuts are placed out of phase with one another and the threads of the bolt. However, in this embodiment two inboard nuts 110 and 112 are provided and placed adjacent to one another on a bolt 114 and within the tube 49. One of the nuts 110 has its flat edges relieved as at 116 to provide generally radial bearing surfaces 118 so that the compressive force exerted by the magnetic forming equipment and transmitted by the tube to the nut urges rotation in one direction. The other nut 112 has its flat edges relieved as at 120 to provide generally radial bearing surfaces 122 so oriented that the nut 112 is urged to rotate in the opposite direction. When the power source is discharged the walls of the tube not only cause such counterrotation but also engage the nuts so as to prevent axial movement of the nuts. Hence, the nut threads are forced out of phase with the bolt threads by a controlled amount.

Thus, it may be seen that utilizing magnetic forming apparatus and methods a variety of improved threaded and adjustable fasteners may be produced in which the threads are changed by permanent deformation or changes in phase relationship in an easily controlled manner. The resistance to rotation of a male member in a female member is increased by a controlled amount, thereby preventing accidental loosening of the fastener but permitting desired adjustments. Furthermore, a single operation securely joins the outer member to the female member and changes the threads, thus simplifying the production of a fastener.

Various features of the invention are set forth in the accompanying claims.

We claim:

1. A method of making a fastener comprising providing an outer member having an opening therein, providing a hollow threaded female member with a wrenching head adjacent one end thereof for receiving an externally threaded male member inserted into said one end thereof, at least a portion of said wall of said female member being weakened to permit deformation of said wall of said female member, disposing said female member partially within said opening of said outer member with said wrenching head protruding therefrom, and simultaneously permanently joining said outer member to said female member and permanently deforming the threads of said female member disposed within said opening of said outer member to increase resistance to rotation of said male member in said female member by establishing a time varying magnetic field outside of said outer member thereby compressing said outer member against said female member and deforming said wall at said weakened portion.

2. A method in accordance with claim 1 wherein said female member is formed of a wall of hard metal with internal threads.

3. A method in accordance with claim 1 wherein said female member is formed of a wall of a plastic material.

4. A method in accordance with claim 3 wherein said female member has internal threads.

5. A method in accordance with claim 1 including controlling said magnetic field to produce a predetermined deformation of said female member.

6. A method in accordance with claim 1 comprising providing said female member with an annular external groove and positioning said female member so that the edges of said opening in said outer member engage said groove upon establishment of said field.

7. A method in accordance with claim 1 wherein said female member has an axially elongated shape and wherein said portion of said female member is weakened by providing said female member with an axially extending slot remote from said entry end of said female member.

8. A method in accordance with claim 1 wherein said female member has chamfered end faces and wherein said portion of said female member is weakened by providing a transverse slot in said female member.

9. A method in accordance with claim 1 wherein said portion of said female member is weakened by providing a transverse slot in said female member including the step of chamfering the edges forming said slot.

10. A method in accordance with claim 1 wherein said portion of said female member is weakened by providing a plurality of axially extending slots.

11. A method in accordance with claim 1 including providing said male member and positioning said male member in said female member before establishing said magnetic field.

12. A method of making a fastener comprising providing an outer member having an opening therein, providing a hollow female member formed of a wall with internal threads with a wrenching head adjacent one end thereof for receiving an externally threaded male member screwed into said one end thereof, disposing said female member partially within said opening of said outer member with said wrenching head protruding therefrom, and simultaneously permanently joining said outer member to said female member and permanently placing some of the threads of said female member disposed within said opening of said outer member out of phase with others of said threads of said female member disposed within said opening of said outer member to increase resistance to rotation of said male member in said female member by establishing a time varying magnetic field outside of said outer member thereby compressing said outer member against said female member and moving a portion of said female member relative to another portion of said female member.

13. A method in accordance with claim 2 including moving a portion of said female member relative to another portion of said female member so that said deformation of said threads places some of said threads of said female member out of phase with other of said threads of said female member.

14. A method in accordance with claim 4 including moving a portion of said female member relative to another portion of said female member so that said deformation of said threads places some of said threads of said female member out of phase with other of said threads of said female member.

15. A method in accordance with claim 13 wherein said portions of said female member are at least partially separated by a transverse slot through said wall and edges of said portions are chamfered.

16. A method in accordance with claim 2 wherein said female member comprises two separate coaxial annular portions, said male member is positioned within said female member before said magnetic field is established and said annular portions are so shaped as to rotate in opposite directions without substantial axial movement upon establishment of said magnetic field.